United States Patent
Nakamoto

(10) Patent No.: US 9,002,211 B2
(45) Date of Patent: Apr. 7, 2015

(54) COMMUNICATION SYSTEM, DISPERSION SLOPE IMPARTING SECTION, AND METHOD FOR COMMUNICATING

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 13/363,773

(22) Filed: Feb. 1, 2012

(65) Prior Publication Data

US 2012/0128362 A1 May 24, 2012

Related U.S. Application Data

(63) Continuation of application No. PCT/JP2009/065339, filed on Sep. 2, 2009.

(51) Int. Cl.
*H04B 10/12* (2006.01)
*H04B 10/2513* (2013.01)
*H04B 10/00* (2013.01)

(52) U.S. Cl.
CPC ...... *H04B 10/2513* (2013.01); *H04B 2210/252* (2013.01); *H04B 2210/254* (2013.01)

(58) Field of Classification Search
USPC .............. 398/29, 81, 147, 148, 149, 192
See application file for complete search history.

(56) References Cited

U.S. PATENT DOCUMENTS

| | | | |
|---|---|---|---|
| 5,877,879 A | 3/1999 | Naito | |
| 6,304,691 B1 | 10/2001 | Espindola et al. | |
| 6,324,317 B1 | 11/2001 | Tanaka et al. | |
| 6,522,455 B1 | 2/2003 | Sardesai | |
| 7,079,769 B1 | 7/2006 | Tsukitani et al. | |
| 7,295,728 B2 | 11/2007 | Cai et al. | |
| 7,373,040 B2 | 5/2008 | Cai et al. | |
| 7,653,310 B2 | 1/2010 | Sekine | |
| 8,606,108 B2 | 12/2013 | Sridhar | |
| 2002/0015207 A1 | 2/2002 | Ooi et al. | |
| 2002/0159119 A1 | 10/2002 | Fries et al. | |
| 2005/0185964 A1* | 8/2005 | Ishikawa | 398/147 |
| 2006/0204171 A1 | 9/2006 | Cai et al. | |
| 2006/0245689 A1 | 11/2006 | Tsukitani et al. | |
| 2007/0177877 A1* | 8/2007 | Sekine | 398/147 |
| 2007/0183787 A1 | 8/2007 | Cai et al. | |

FOREIGN PATENT DOCUMENTS

| | | |
|---|---|---|
| CN | 101026419 A | 8/2007 |
| CN | 101128763 A | 2/2008 |

(Continued)

OTHER PUBLICATIONS

International Search Report for PCT/JP2009/065339 mailed Dec. 1, 2009.

(Continued)

*Primary Examiner* — Daniel Dobson
(74) *Attorney, Agent, or Firm* — Staas & Halsey LLP

(57) ABSTRACT

A communication system includes a transmission path through which an optical signal is propagated; and dispersion slope imparting sections provided on a transmitting side and a receiving side of the transmission path, the dispersion slope imparting sections imparting different dispersion and dispersion slope characteristics in accordance with a wavelength band of the optical signal, wherein the dispersion and dispersion slope characteristics imparted by the dispersion slope imparting section on the transmitting side is different from those on the receiving side.

6 Claims, 18 Drawing Sheets

(56) References Cited

FOREIGN PATENT DOCUMENTS

| EP | 1202479 A1 | 5/2002 |
|---|---|---|
| JP | 9-46318 | 2/1997 |
| JP | 2000-221338 | 8/2000 |
| JP | 2000-261376 | 9/2000 |
| JP | 2002-57622 | 2/2002 |
| JP | 2008-532435 | 8/2008 |
| WO | WO 01/06682 A1 | 1/2001 |
| WO | 2006/094164 | 9/2006 |

OTHER PUBLICATIONS

Office Action mailed Mar. 28, 2014 in corresponding Chinese Application No. 200980161129.8.
Chinese Office Action for Appln. No. 200980161129.8 dated Nov. 24, 2014.
Extended European Search Report dated Feb. 5, 2015 in corresponding European Patent Application No. 09848965.1.

* cited by examiner

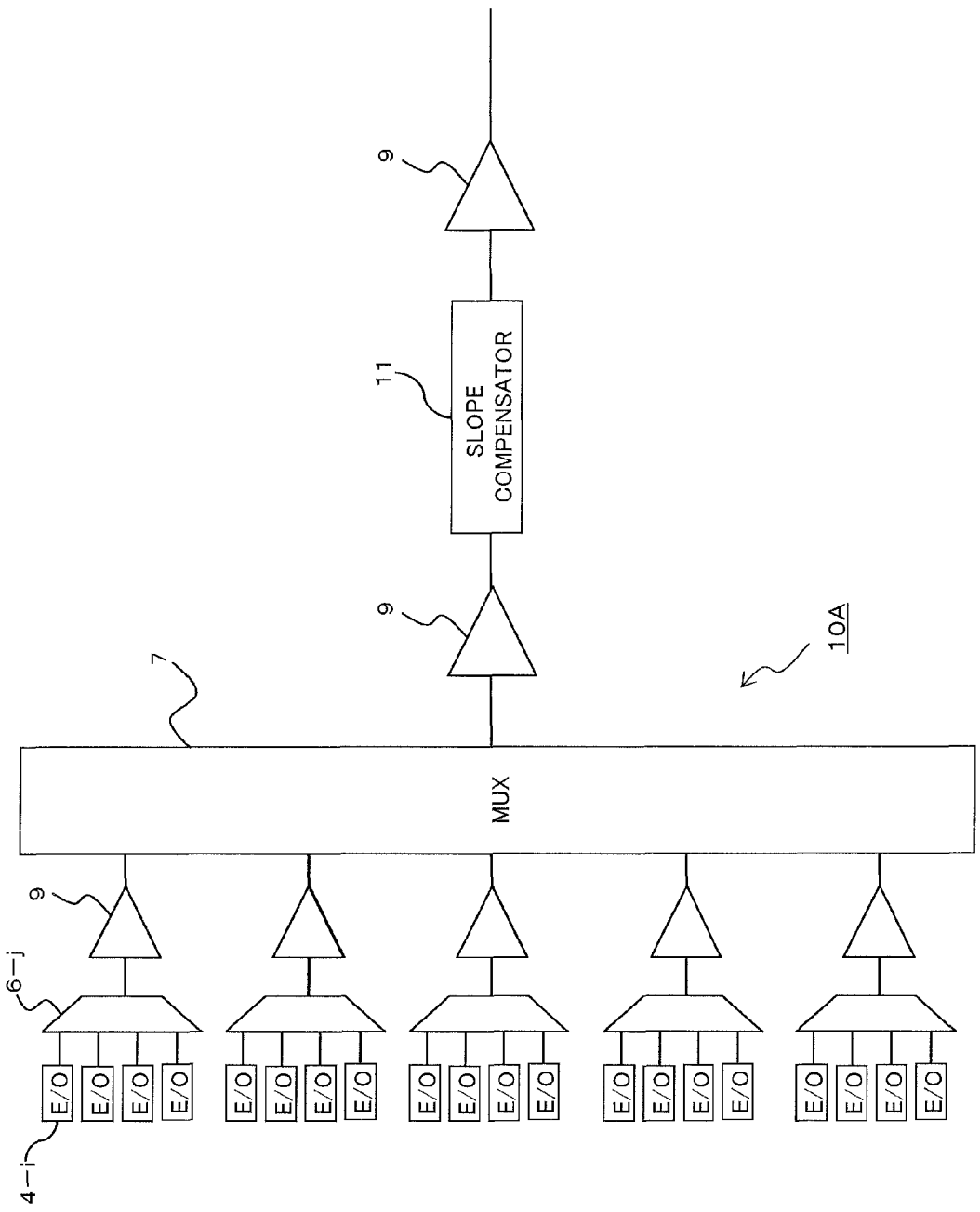

COMMUNICATION SYSTEM, DISPERSION SLOPE IMPARTING SECTION, AND METHOD FOR COMMUNICATING

CROSS-REFERENCE TO RELATED APPLICATION

This application is a continuation Application of a PCT international application No. PCT/JP2009/065339 filed on Sep. 2, 2009 in Japan, the entire contents of which are incorporated by reference.

FIELD

The embodiments discussed herein are related to a communication system, a dispersion slope imparting section, and a method for communicating, which are used in a system transmitting wavelength division multiplexed optical signals at a longer distance, for example.

BACKGROUND

In an optical communication system, chromatic dispersion generated in an optical fiber, which is a component of an optical transmission path, induces waveform distortions in optical signals. In order to assure a satisfactory signal quality, chromatic dispersion accumulated while an optical signal is transmitted through the optical transmission path is compensated for on the receiving side.

Further, as the transmission distance of optical signals is increased, the influence of the wavelength dependency of chromatic dispersion (dispersion slope) cannot be ignored. In other words, in order to suppress waveform distortions, the values of chromatic dispersion to be compensated for in channels on a shorter wavelength side is different from those in channels on a longer wavelength side.

An example optical transmission path may be configured from a transmission fiber, such as a non zero-dispersion shifted fiber (NZ-DSF), and a dispersion compensating fiber (DCF). In this configuration, with the wavelength dependency of the chromatic dispersion (dispersion slope) of 0.1 ps/nm/km/nm, the transmission path length of the optical transmission path of 10000 km, and the light wavelength in a range from 1545 nm to 1555 nm, the chromatic dispersion in the optical transmission path deviates in a range of 10000× 0.1×10=10000 ps/nm.

In other words, even when the dispersion at a light wavelength of 1550 nm is as small as +0 ps/nm/km, chromatic dispersion deviates in a range of 10000 ps/nm for light ranging from 1545 nm to 1555 nm.

The following Patent Reference 1 discloses a dispersion compensation device.
Patent Reference 1: WO 2001/006682

SUMMARY (1) According to an aspect of the embodiments, a system includes a communication system including: a transmission path through which an optical signal is propagated; and dispersion slope imparting sections provided on a transmitting side and a receiving side of the transmission path, the dispersion slope imparting sections imparting different dispersion and dispersion slope characteristics in accordance with a wavelength band of the optical signal, wherein the dispersion and dispersion slope characteristics imparted by the dispersion slope imparting section on the transmitting side is different from those on the receiving side.

(2) According to an aspect of the embodiments, an apparatus includes the dispersion slope imparting sections of the above (1).

(3) According to an aspect of the embodiments, a method includes a method for communicating an optical signal through a transmission path, the method including: imparting different dispersion and dispersion slope characteristics in accordance with a wavelength band of the optical signal, on a transmitting side and a receiving side of the transmission path, wherein the dispersion and dispersion slope characteristics imparted on the transmitting side is different from those on the receiving side.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 7 is a diagram depicting an example of a transmitting terminal including a dispersion slope compensator;

DESCRIPTION OF EMBODIMENTS

Dispersion Compensation Technique

Figure 1:
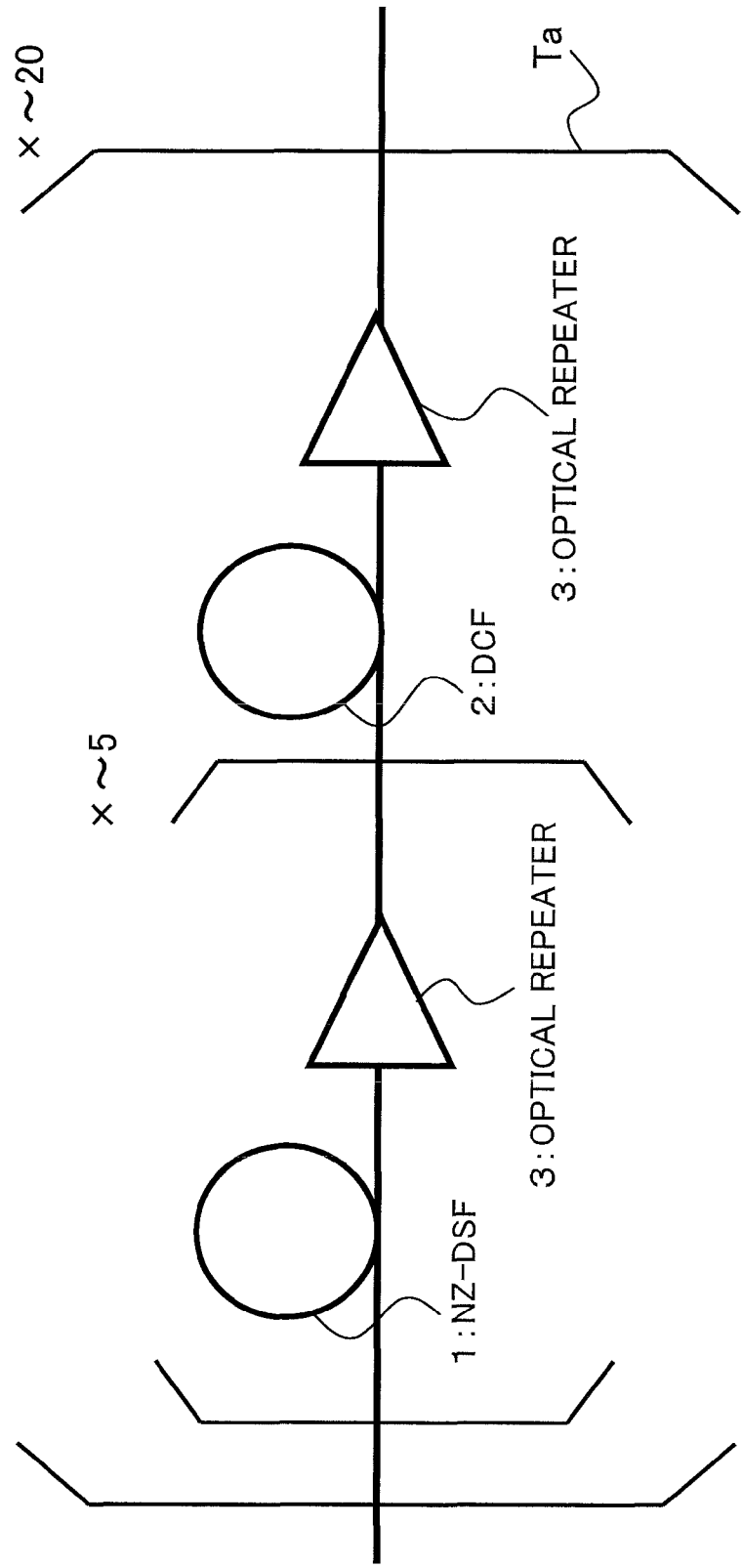
FIG. 1 is a diagram illustrating an exemplary configuration of a transmission path in an undersea system.

FIG. 1 illustrates an exemplary configuration of a transmission path in a system. A transmission path unit module Ta, which includes five spans of an NZ-DSF 1 with a length of 50 km and a DCF 2 with a length of 80 km, is repeated 20 cycles. In other words, 20 of the above-described transmission path unit module Ta are serially connected. It should be noted that an optical repeater 3 may be provided at the stage subsequent to the NZ-DSF, or the stage subsequent to the DCF, where appropriate.

Figure 2:
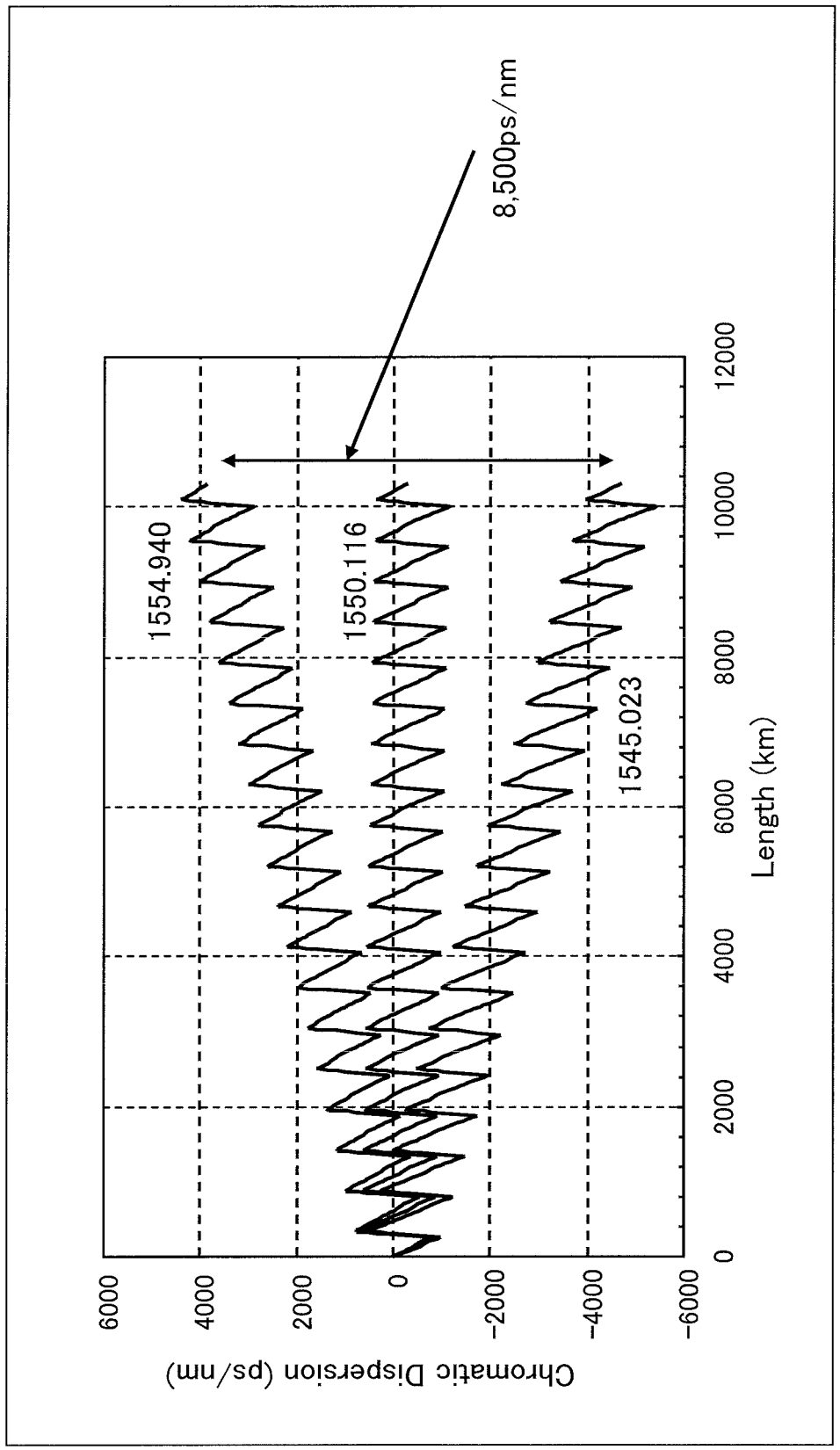
FIG. 2 is a diagram illustrating an example of the dispersion map of the transmission path.

The dispersion map of this transmission path is depicted in FIG. 2. In this configuration, the difference of compensation at the maximum of 8,000 ps/nm is observed between the shortest wavelength channel and the longest wavelength channel. As in this case, the dispersion compensation is sometimes required to be adjusted in each channel.

Figure 3:
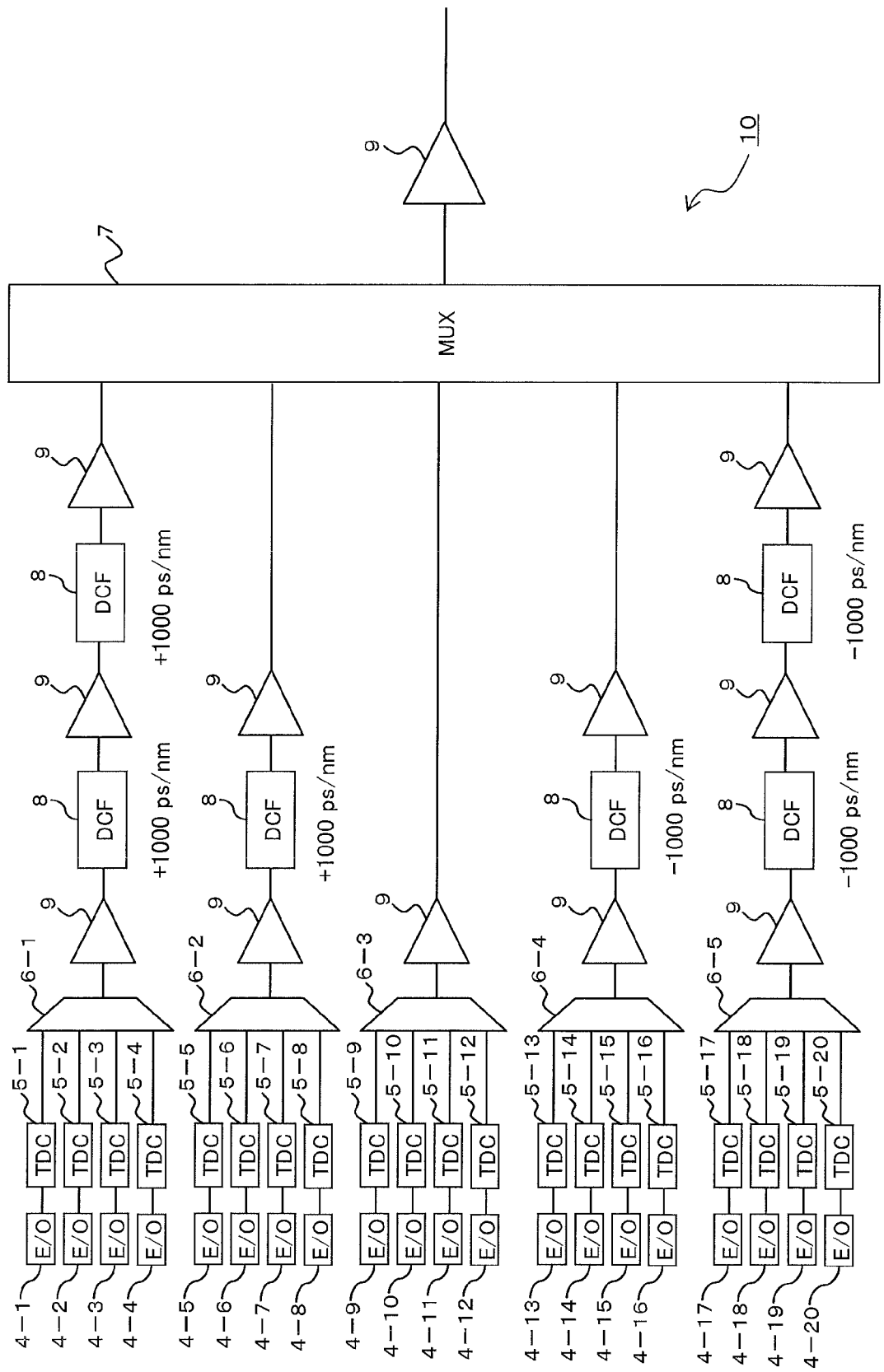
FIG. 3 illustrates an exemplary configuration of a transmitting-side terminal for adjusting dispersion compensation in each channel.
Figure 4:
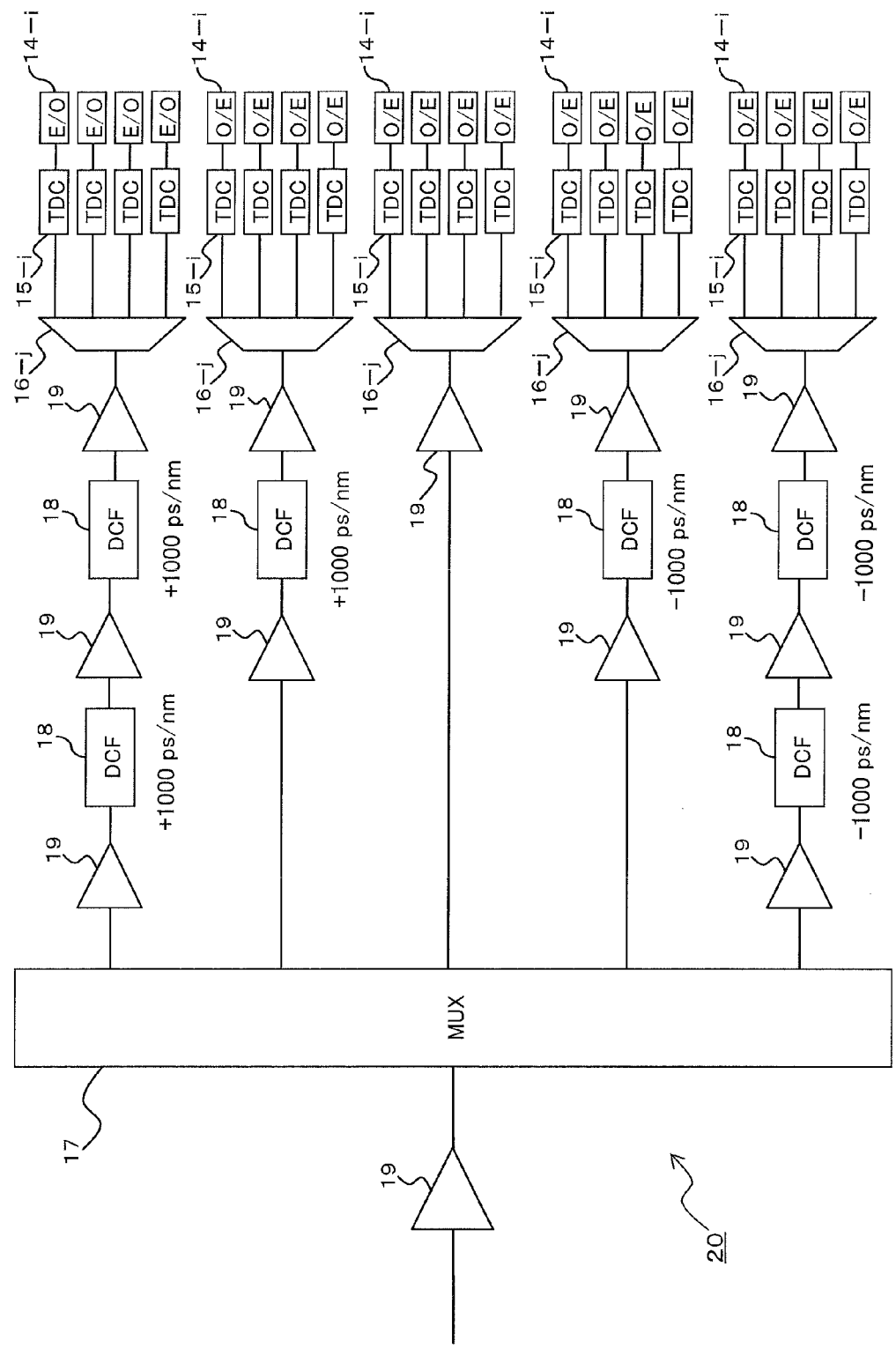
FIG. 4 illustrates an exemplary configuration of a receiving-side terminal for adjusting dispersion compensation in each channel.

FIGS. 3 and 4 illustrate an exemplary configuration of transmitting- and receiving-side terminals for adjusting dispersion compensation in each channel. In a transmitting terminal 10 exemplified in FIG. 3, the reference numerals 4-$i$ ($i$=1 to 20) denote signal light sources, the reference numerals 5-$i$ denotes tunable dispersion compensators (TDCs), the reference numerals 6-$j$ ($j$=1 to 5) and 7 denote multiplexers (MUXs), the reference numerals 8 denote DCFs, and the reference numerals 9 denote optical amplifiers.

The signal light sources 4-$i$ output optical signals at the respective wavelengths used for wavelength division multiplexing. It should be noted that the wavelengths of the optical signals outputted from the components denoted by reference symbols followed by the number "i" are increased as the value of "i" increases. The TDCs 5-$i$ compensate for the dispersions in the optical signals from the signal light source 4-$i$ with a variable magnitude. The MUXs 6-$j$ multiplex (wavelength division multiplex) the optical signals from the TDCs 5-$i$ in a group of four adjacent channels. It should be noted that the wavelengths of the optical signals wavelength division multiplexed by the components denoted by reference symbols followed by the number "j" are increased as the value of "j" increases.

On the propagation paths of the optical signal outputted from the MUX 6-$j$, one or more DCF 8 of fixed dispersion compensations (+1000 ps/nm or −1000 ps/nm) are interposed in different number, in order to provide different values of dispersion compensation in accordance with the wavelength bands. In other words, the compensations of +2000 ps/nm, +1000 ps/nm, 0 ps/nm, −1000 ps/nm, and −2000 ps/nm are provided to the optical signals from shorter wavelengths to longer wavelengths.

It should be noted that the MUX 7 multiplexes (wavelength division multiplexes) the optical signals dispersion compensated by the DCFs 8. The optical amplifiers 9 are interposed on the propagation paths of the optical signals outputted from the MUXs 6-$j$ and 7, where appropriate. In the exemplified transmitting terminal 10, the values of dispersion compensation by the DCFs 8 and the values of dispersion compensation by the TDCs 5-$i$ adjust dispersion compensation in each wavelength, i.e., the preceding dispersion compensation before the wavelength division multiplexed optical signals propagate through the transmission path.

In the receiving terminal 20 exemplified in FIG. 4, the reference symbols 14-$i$ denote receivers that receive optical signals of the respective channels corresponding to the signal light sources 4-$i$ depicted in FIG. 3. Further, the reference symbols 16-$j$ and 17 denote DEMUXs (demultiplexers) that demultiplex (wavelength division demultiplex) the optical signals of the respective channels corresponding to the MUXs 6-$j$ and 7 depicted in FIG. 3. Further, the reference symbols 15-$i$ 18, and 19 denote TDCs, DCFs, and optical amplifiers, having the structures and arrangements similar to the structures and arrangements of the corresponding components (see reference symbols 5-$i$, 8, and 9) in FIG. 3.

In the exemplified receiving terminal 20, the values of dispersion compensation by the DCFs 18 and the values of dispersion compensation by the TDCs 15-$i$ adjust dispersion compensation in each channel, i.e., dispersion compensation after the wavelength division multiplexed optical signals propagate through the transmission path. It is expected, however, that the example depicted in FIGS. 3 and 4, requires a great number of DCFs, optical amplifiers, tunable dispersion compensators, which may boost up the price and the size of the structure.

In order to suppress such increases in the price and the size of the structure, proposed are communication systems that compensate for the dispersion slopes. These systems include fiber bragg gratings (FBGs) exhibiting a wavelength dependency of delay time.

Figure 5A:
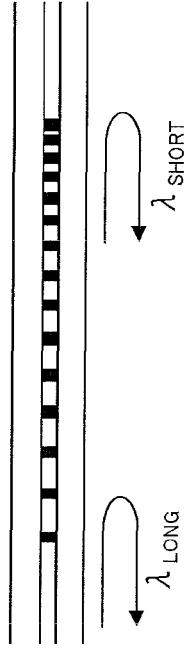
FIG. 5A is a diagram illustrating an exemplary configuration of a fiber grating.

A typical fiber grating dispersion compensator which does not compensate for the dispersion slope is depicted in FIG. 5A. The fiber grating is fabricated such that the position at which light is reflected varies and accordingly the delay time varies, depending on wavelengths of the light.

Figure 5B:
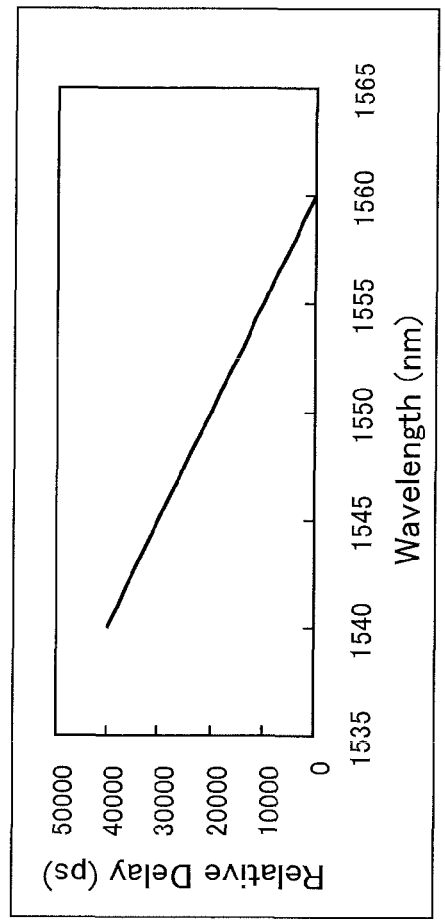
FIG. 5B is a diagram illustrating the delay characteristic of the fiber grating.
Figure 5C:
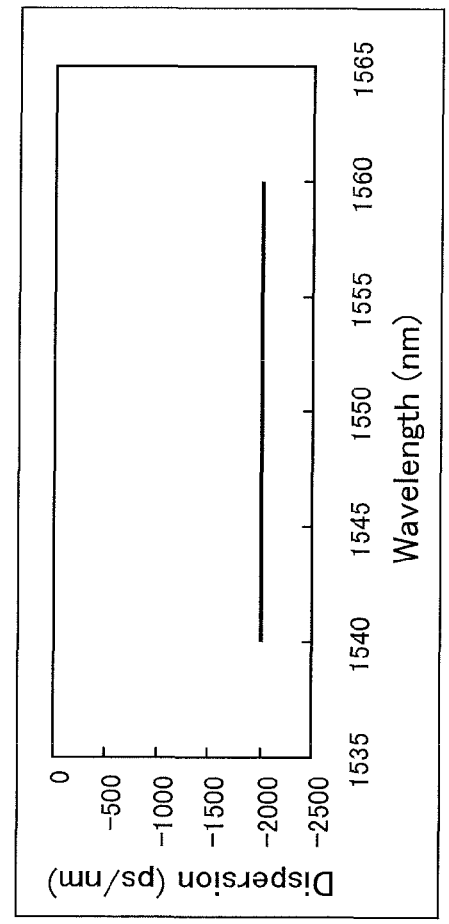
FIG. 5C is a diagram illustrating the chromatic dispersion characteristic of the fiber grating.

One example is a fiber grating wherein the delay time drops linearly with the wavelength, as depicted in FIG. 5B. The chromatic dispersion is the derivatives of the delay time with respect to the wavelength. The chromatic dispersion for the delay characteristic in FIG. 5B is −2000 ps/nm, as depicted in FIG. 5C. In this case, the value of the chromatic dispersion is constant irrespective of the wavelength, and the dispersion slope, which is the wavelength dependency of the chromatic dispersion, is zero. Therefore, a dispersion compensator having the characteristic set forth above does not compensate for the dispersion slope.

Figure 6A:
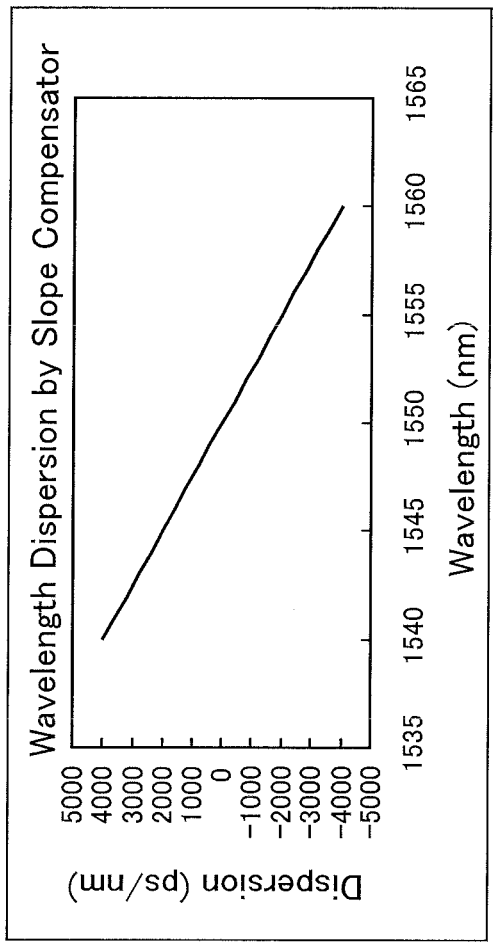
FIG. 6A is a diagram illustrating the chromatic dispersion characteristic of a dispersion slope compensator.
Figure 6B:
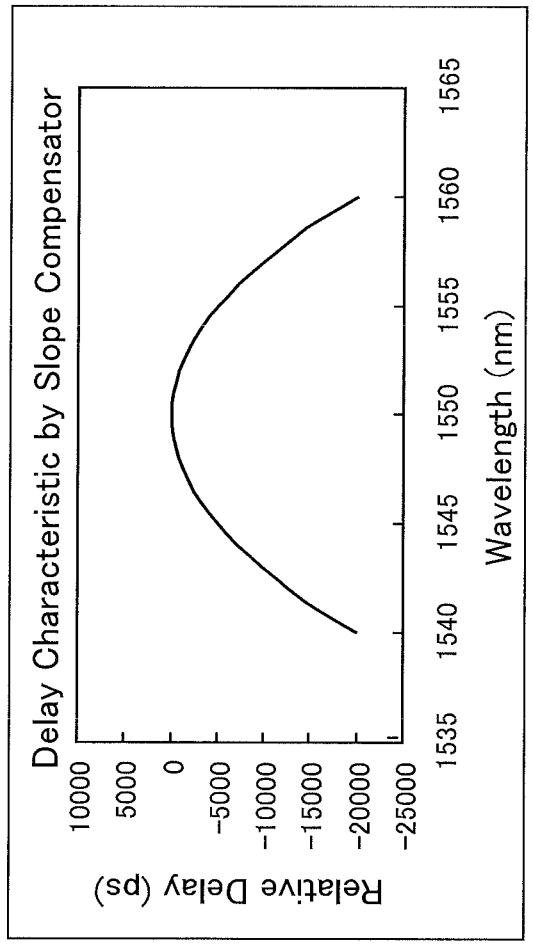
FIG. 6B is a diagram illustrating the delay characteristic of the slope compensator.

An exemplary characteristic of a fiber grating which is capable of compensating for the slope is depicted in FIG. 6. A compensation characteristic wherein the chromatic dispersion linearly changes with the wavelength, as the one exemplified in FIG. 6A, can be embodied by using a fiber grating having a delay characteristic of the quadric function depicted in FIG. 6B, which is derived by integrating the linear function in FIG. 6A.

Technique for Dispersion Slope Compensation Concurrently with Dispersion

Figure 8:
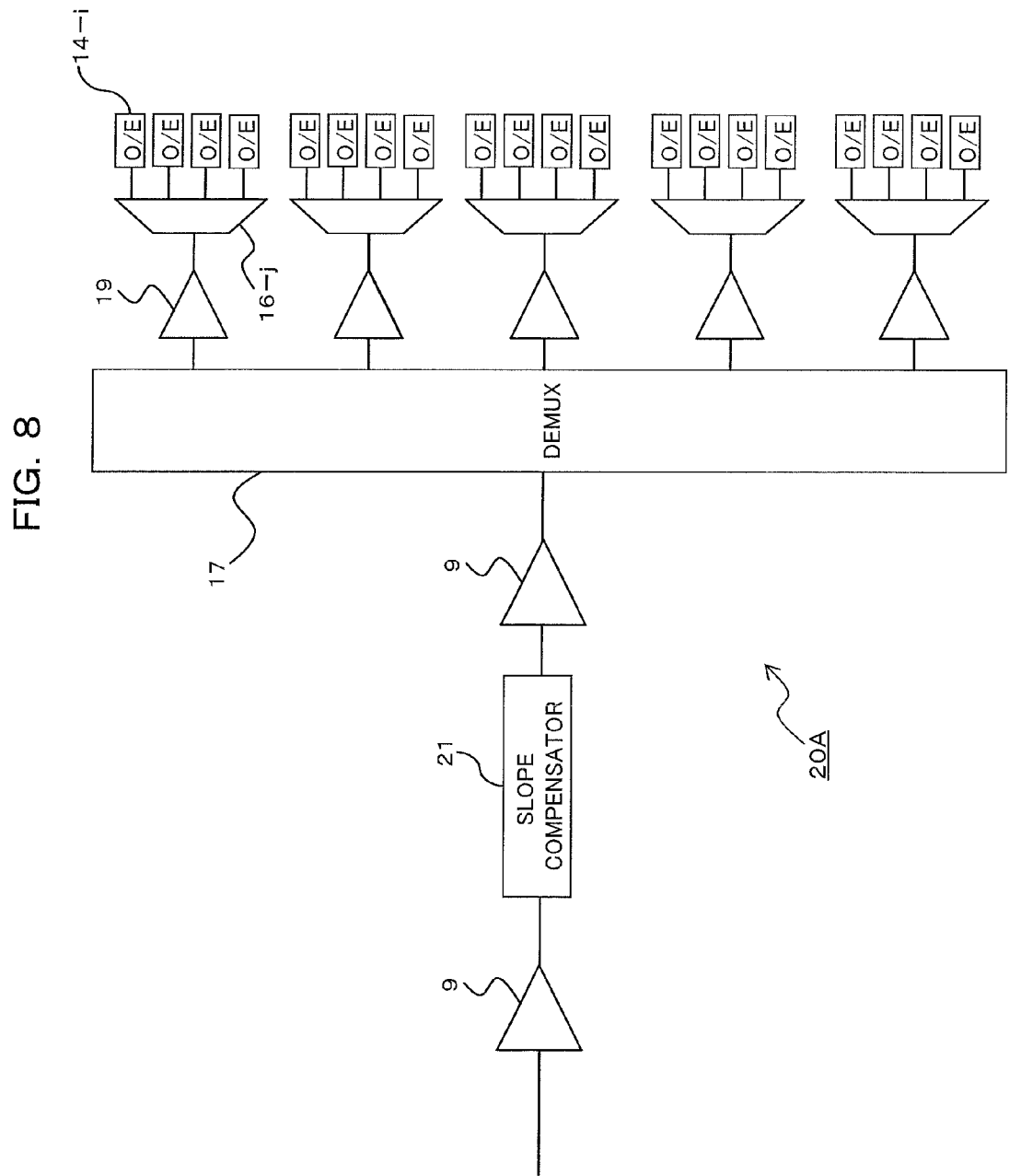
FIG. 8 is a diagram depicting an example of a receiving terminal including a dispersion slope compensator.

A slope compensator with the characteristics as exemplified in FIG. 6 can be used for transmitting and receiving terminals. An example of a transmitting terminal 10A having a slope compensator 11 is depicted in FIG. 7, and an example of a receiving terminal 20A having a slope compensator 21 is depicted in FIG. 8. The same reference symbols as the previously described reference symbols denote substantially similar elements. In the transmitting terminal 10A exemplified in FIG. 7 and the receiving terminal 20A exemplified in FIG. 8, the slope compensators 11 and 21 are interposed on a propagation path for wavelength division multiplexed optical signals.

As compared to the corresponding terminals depicted in FIGS. 3 and 4 (the reference symbols 10 and 20), in the exemplified transmitting and receiving terminals 10A and 20A, DCFs 8 and 18, optical amplifiers 9 and 19, and tunable dispersion compensators 5-*i* and 15-*i*, provided for the respective wavelength bands, can be eliminated or reduced in number. Accordingly, the price and the size of the structure can be reduced.

Figure 9:
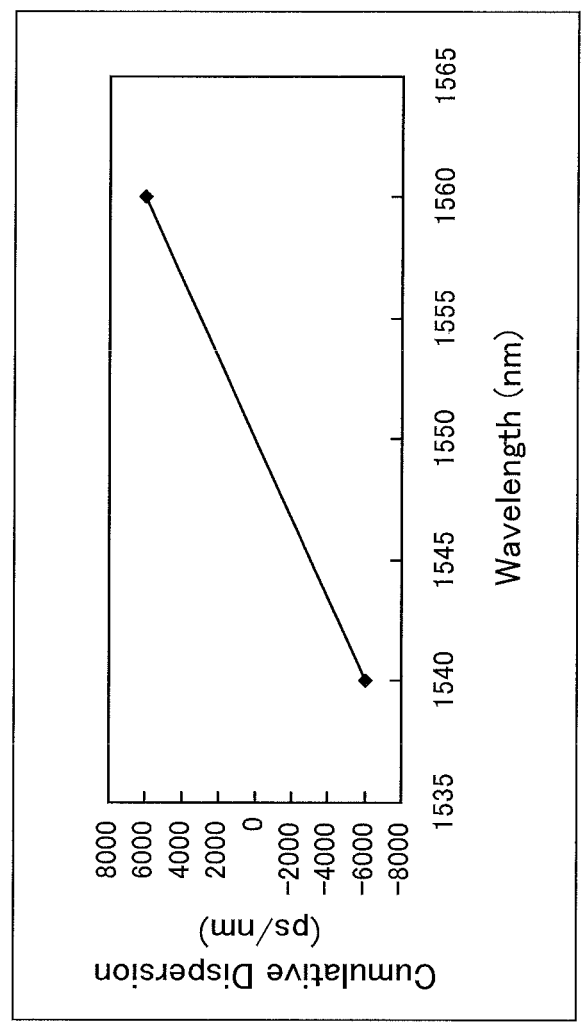
FIG. 9 is a diagram illustrating the chromatic dispersion characteristic of the transmission path.

It is assumed that the transmitting terminal 10A depicted in FIG. 7 and the receiving terminal 20A depicted in FIG. 8 are connected to each other through an optical transmission path. If the cumulative dispersion in the optical transmission path in the wavelength bands exhibits the characteristic as depicted in FIG. 9, dispersion (or dispersion slope) can be compensated for in each wavelength band by combining the above-described slope compensators 11 and 21 set forth above.

Figure 10:
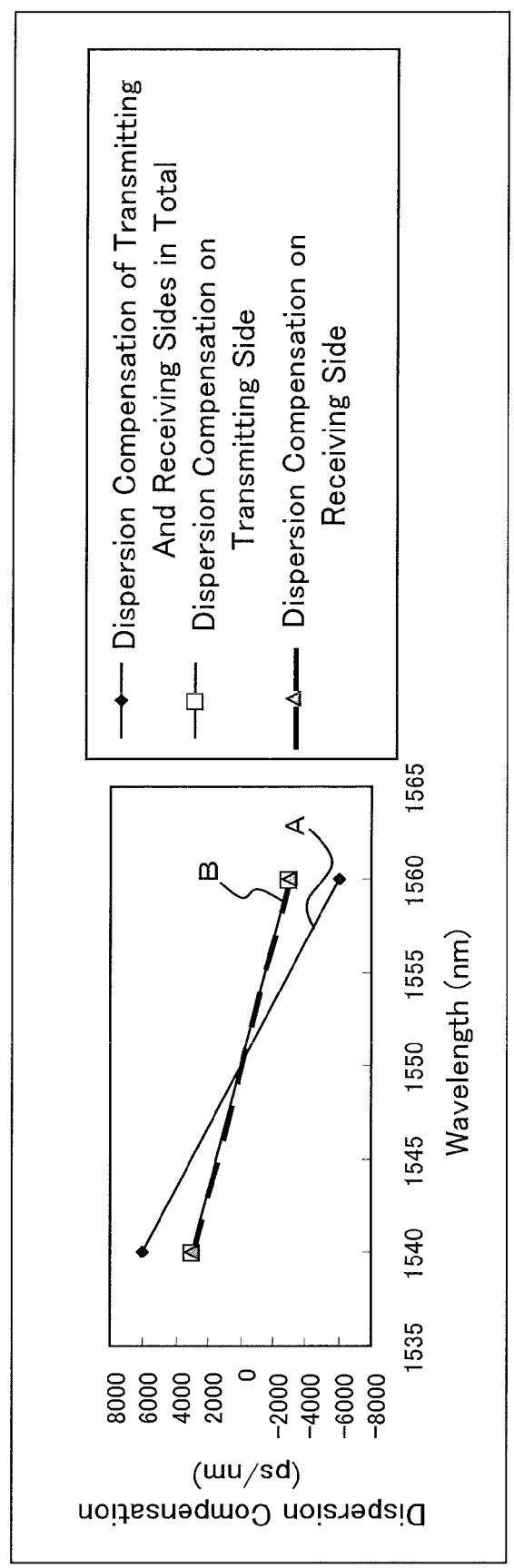
FIG. 10 is a diagram depicting an example of chromatic dispersion compensation, concurrently with dispersion slope compensation.

In this case, by providing dispersion compensation with the dispersion values in accordance with the wavelength, as indicated with the line A in FIG. 10, as the sum of the compensations by the slope compensators 11 and 21, the chromatic dispersion in each wavelength band is reduced to zero. For example, if the dispersion compensation characteristic indicated by the line A in FIG. 10 is shared between the slope compensators 11 and 21 with a ratio of 50:50, the slope compensators 11 and 21 provide dispersion compensation with the dispersion values in accordance with the wavelength, as indicated by the line B in FIG. 10.

In the meantime, the non-linear effect in the optical transmission path varies, depending on the transmission path parameters of the optical transmission path, as well as the optical power. The following Eq. (1) expresses the magnitude of the non-linear Φ given in accordance with the transmission path parameters. In Eq. (1), A is the signal wavelength, $n_2$ is the non-linear refractive index of the optical fiber, $A_{eff}$ is the fiber effective area, $L_{SPAN}$ is the span length, α is the fiber loss, and P is the fiber input power.

Eq. 1

$$\Phi_{NL}[\text{rad}/m] = \frac{2\pi}{\lambda} \cdot \frac{n_2}{A_{eff}} \cdot \int_0^{L_{SPAN}} P\exp(-\alpha \cdot L_{SPAN})dL/L_{SPAN} \quad (1)$$

Figure 11:
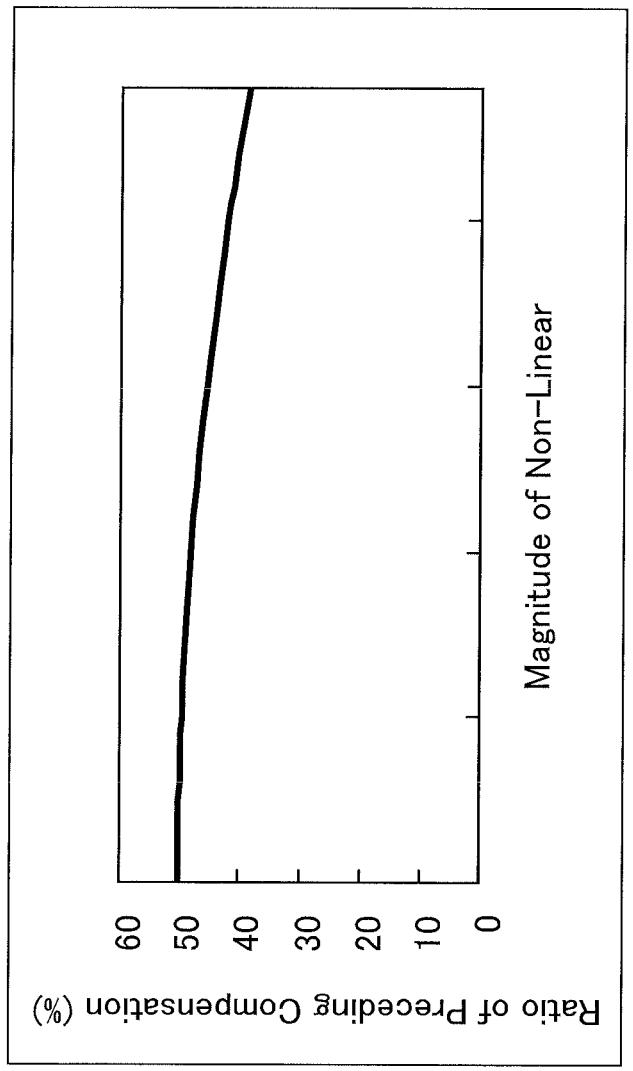
FIG. 11 is a diagram illustrating an exemplary setting of an optimal ratio of the value of preceding compensation at the transmitting terminal, to the values of dispersion compensation at the transmitting and receiving terminals, in accordance with the magnitude of non-linear degradation in the transmission path.

In addition, the ratio of the value of preceding compensation by the transmitting terminal 10A to the value of compensation by the receiving terminal 20A varies in accordance with the magnitude of the non-linear, as exemplified in FIG. 11, for assuring a desired signal quality in the receiving terminal 20A. That is, the desired reception signal quality is obtained by changing the ratio of the values of dispersion compensation by the transmitting and receiving terminals 10A and 20A in accordance with the magnitude of the non-linear Φ defined by the fiber parameters of the optical transmission path, from 50:50.

Figure 12:
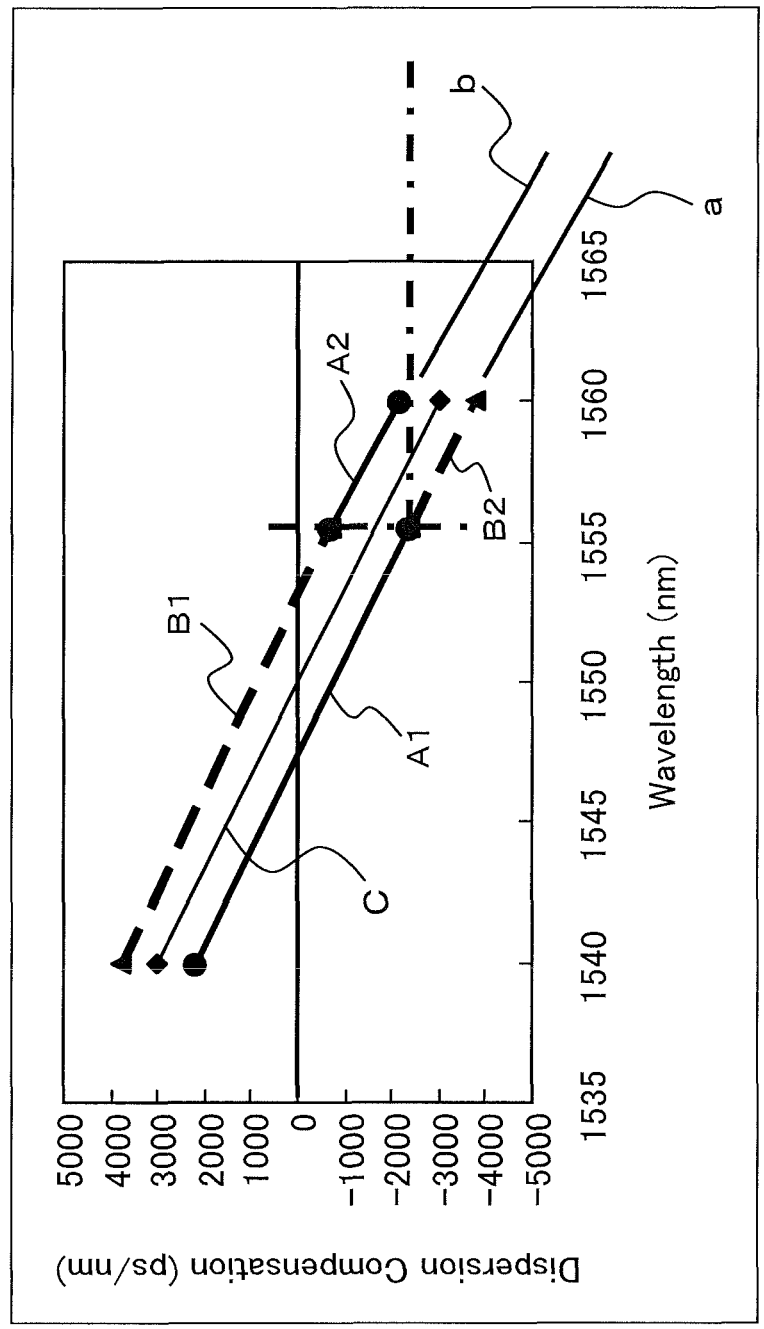
FIG. 12 is a diagram illustrating an example wherein the ratio of the values of dispersion compensation at transmitting and receiving terminals is changed from 50:50.

FIG. 12 is a diagram illustrating an example wherein the ratio of the values of dispersion compensation at the transmitting and receiving terminals 10A and 20A is changed from 50:50 set forth above. In FIG. 12, the solid lines A1 and A2 connecting circle plots indicate the dispersion compensation characteristic of the slope compensator 11 in the transmitting terminal 10, and broken lines B1 and B2 connecting triangle plots indicate the dispersion compensation characteristic of the slope compensator 21 in the receiving terminal 20A.

For setting the exemplified dispersion compensation, two different slope compensation sections exhibiting different characteristics near wavelengths of 1556 nm are used in each of the slope compensators 11 and 21. The values of dispersion compensation at the transmitting and receiving terminals 10A and 20A are set by the following procedure:

The cumulative chromatic dispersion characteristic in the optical transmission path is determined for each wavelength. The determined cumulative chromatic dispersion characteristic is divided by 2 to obtain characteristics with opposite polarities. In other words, by providing dispersion compensation with the derived characteristics, dispersion can be compensated for, concurrently with the dispersion slope of the transmission path.

As an example, when the cumulative chromatic dispersion characteristic is linear with about −6000 ps/nm, about 0 ps/nm, about +6000 ps/nm near wavelengths of 1540 nm, 1550 nm, and 1560 nm, respectively, the characteristic of the straight line C in FIG. 12 is derived. If an NZ-DSF is used in the optical transmission path, the dispersion near wavelengths of 1550 nm is 0 ps/nm as exemplified in FIG. 12.

In the characteristic of the straight line C, the dispersion compensation is about +3000 ps/nm, about 0 ps/nm, and about −3000 ps/nm near wavelengths of 1540 nm, 1550 nm, and 1560 nm, respectively. Then, while the characteristic of the straight line C set forth above is kept to be the sum of dispersion compensation at the transmitting and receiving terminals 10A and 20A, the optimal ratio of the values of dispersion compensation at the transmitting and receiving terminals 10A and 20A is determined.

The optimal ratio may be obtained from calculated magnitude of the above-described non-linear, or the compensation ratio for optimizing the reception signal quality may be measured in an actual system. For example, the optimal ratio can be estimated easily from the non-linear phase shift determined from the optical fiber characteristic parameters indicated in Eq. (1) and the optical power per wave. For a system which has been already installed, the optimal dispersion compensation can be determined by propagating actual optical signals through the system.

Two characteristic straight lines can be derived by translating the characteristic of the straight line C, in accordance with the ratio of the values of dispersion compensation at the transmitting and receiving terminals 10A and 20A derived as described above. In the example in FIG. 12, two straight lines "a" and "b" are derived. More specifically, preceding dispersion compensation is provided at the transmitting terminal 10A in accordance with the characteristic of the straight line "a" (A1) on a shorter wavelength side, and is provided at the receiving terminal 20A in n accordance with the characteristic of the straight line "b" (B1) on a shorter wavelength side.

It should be noted that when the transmitting terminal 10A provides dispersion compensation on the longer wavelength side in accordance with the characteristic of the straight line "a", the absolute value of the preceding dispersion compensation is increased. When the absolute value of preceding dispersion compensation is increased, the waveform distortion caused by dispersion compensation is aggravated before the transmission on the optical transmission path. The aggravated waveform distortion tends to result in deteriorated reception sensitivity, which may hinder achieving a satisfactory reception signal quality, which is the goal of this embodiment.

In order to address this issue, the characteristic of preceding dispersion compensation at the transmitting terminal 10A in this embodiment, for example, shifts to the line "b" (A2) near the wavelength (near 1556 nm) where the dispersion compensation corresponding to the dispersion compensation at the longest wavelength on the line "b" (1560 nm, in this graph) is obtained on the line "a". That is, in the wavelength band near a wavelength of 1556 nm or longer, the transmitting terminal 10A provides preceding dispersion compensation with the characteristic of the straight line A2.

Thereby, the sensitivity can be improved by selecting the dispersion slope to be compensated for such that the absolute value of dispersion compensation on the transmitting side is not increased, at wavelengths longer than the zero dispersion wavelength (e.g., 1550 nm) of the transmission path fiber. On the contrary to the transmitting side dispersion compensation at the receiving terminal 20A shifts on the line "b" (B1) as the wavelength increases, from a shorter wavelength side (e.g., near 1540 nm, in FIG. 12), and shifts on the line "a" (B2) at wavelengths longer than the wavelength (near 1556 nm) where the transmitting side shifts to the line "a".

Therefore, the slope compensators 11 and 21 are examples of dispersion slope imparting sections imparting different dispersion and dispersion slope characteristics in accordance with a wavelength band of the optical signal, wherein the dispersion and dispersion slope characteristics imparted by the dispersion slope imparting section 11 on the transmitting side (reference symbol 11) are different from those imparted by the dispersion slope imparting section 21 on the receiving side (reference symbol 21).

Figure 13:
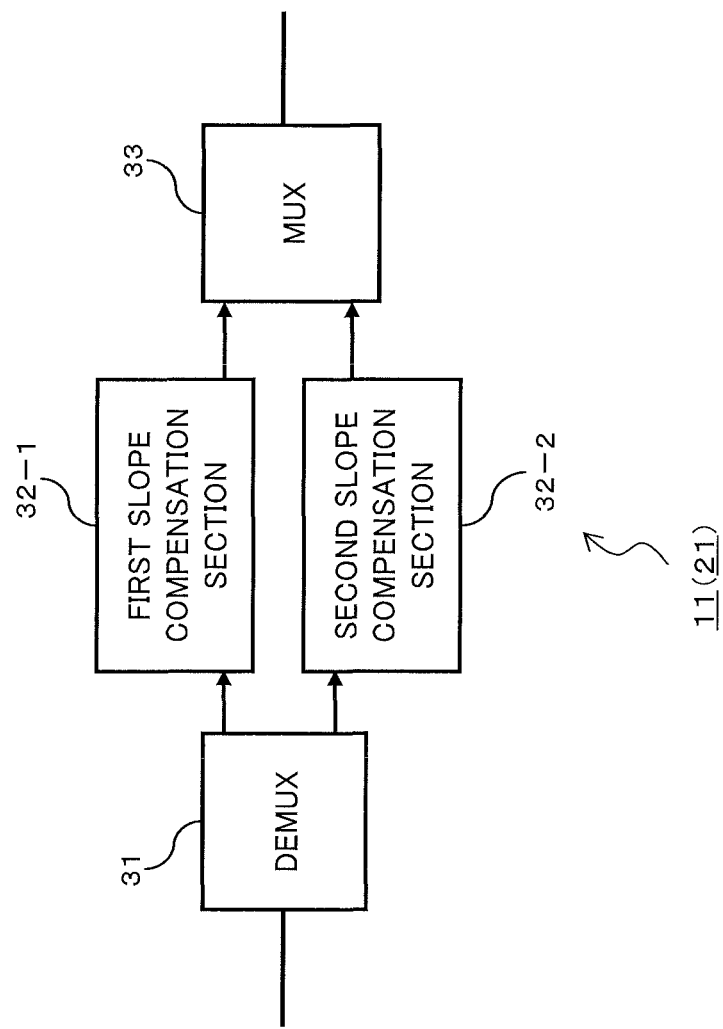
FIG. 13 is a diagram illustrating an exemplary configuration of the slope compensator.

An exemplary configuration of the slope compensators 11 and 21 achieving the above-described dispersion compensation characteristic is depicted in FIG. 13. The slope compensators 11 and 21 each includes a DEMUX 31, first and second slope compensation sections 32-1 and 32-2, and an MUX 33.

The DEMUX (demultiplexer) 31 demultiplexes an inputted optical signal into an optical signal at a wavelength shorter than 1556 nm, or equal to or less than 1556 nm (short wavelength side optical signal), and an optical signal at a wavelength equal to or greater than 1556 nm, or longer than 1556 nm (long wavelength side optical signal). In other words, the DEMUX 31 is one example of a demultiplexer that demultiplexes an inputted optical signal into a plurality of (two, in this case) signals.

The first slope compensation section 32-1 provides dispersion compensation on the short wavelength side optical signal demultiplexed by the DEMUX 31, using the dispersion compensation characteristic that is set therein. The first slope compensation section 32-1 in the slope compensator 11 provided in the transmitting terminal 10A provides dispersion compensation in accordance with the characteristic of the line A1 depicted in FIG. 12, for example. Further, the first slope compensation section 32-1 in the slope compensator 21 provided in the receiving terminal 20A provides dispersion compensation in accordance with the characteristic of the line B1 depicted in FIG. 12, for example.

Similarly, the second slope compensation section 32-2 provides dispersion compensation on the long wavelength side optical signal demultiplexed by the DEMUX 31, using the dispersion compensation characteristic that is set therein. The second slope compensation section 32-2 in the slope compensator 11 provided in the transmitting terminal 10A provides dispersion compensation in accordance with the characteristic of the line A2 depicted in FIG. 12, for example. Further, the second slope compensation section 32-2 in the slope compensator 21 provided in the receiving terminal 20A provides dispersion compensation in accordance with the characteristic of the line B2 depicted in FIG. 12, for example.

The transmitting and receiving side slope compensators 11 and 21, in combination, impart the dispersion and dispersion slope characteristics indicated by the straight line A in FIG. 10. The straight line A is reserve to the dispersion and dispersion slope characteristics of the transmission path (see FIG. 9). Accordingly, it is regarded that the transmitting and receiving side slope compensators 11 and 21 impart the dispersion and dispersion slope characteristics of the transmission path, which compensate for the dispersion and dispersion slope characteristics, in combination.

Here, the dispersion and dispersion slope characteristics A1 imparted to the short wavelength region of the wavelength division multiplexed optical signal in the transmitting side dispersion slope imparting section 11 is compared with the dispersion and dispersion slope characteristics A2 imparted to the long wavelength region of the wavelength division multiplexed optical signal. The characteristic A1 has the value equivalent to the dispersion slope corresponding to the slope in FIG. 12, but the wavelength providing the zero dispersion is shifted to the shorter wavelength side than in the characteristic A2.

Further, the dispersion and dispersion slope characteristics B1 imparted to the short wavelength region of the wavelength division multiplexed optical signal in the receiving side dispersion slope imparting section 21 is compared with the dispersion and dispersion slope characteristics B2 imparted to the long wavelength region of the wavelength division multiplexed optical signal. The characteristic B1 has the value equivalent to the dispersion slope corresponding to the slope in FIG. 12, but the wavelength providing the zero dispersion is shifted to the longer wavelength side than in the characteristic B2.

Further, the first and second slope compensation sections 32-1 and 32-2 described above are slope imparting devices imparting dispersion and dispersion slope characteristics to the optical signal demultiplexed by the demultiplexer 31, in accordance with the respective wavelength bands. It should be noted that the first and second slope compensation sections 32-1 and 32-2 in the slope compensators 11 and 21 can be embodied by using fiber gratings and the like wherein appropriate values of slope compensation according to the above characteristics are set.

The MUX 33 multiplexes optical signals of the respective wavelength bands which undergo dispersion compensation in the first and second slope compensation sections 32-1 and 32-2. In the slope compensator 11, the optical signal multiplexed in the MUX 33 is transmitted through an optical transmission path. On the other hand, in the slope compensator 21, the optical signal multiplexed in the MUX 33 is demultiplexed to signals of respective WDM channels and then received.

Structures other than those described above and depicted in FIG. 13 may be used as the slope compensators 11 and 21. For example, the slope compensators 11 and 21 may be embodied by a fiber grating which exhibits different slope characteristics in a shorter wavelength band and a longer wavelength band. Examples of characteristics of fiber gratings exhibiting different slope characteristics in different wavelength bands are depicted in FIGS. 14 to 16.

Figure 14:
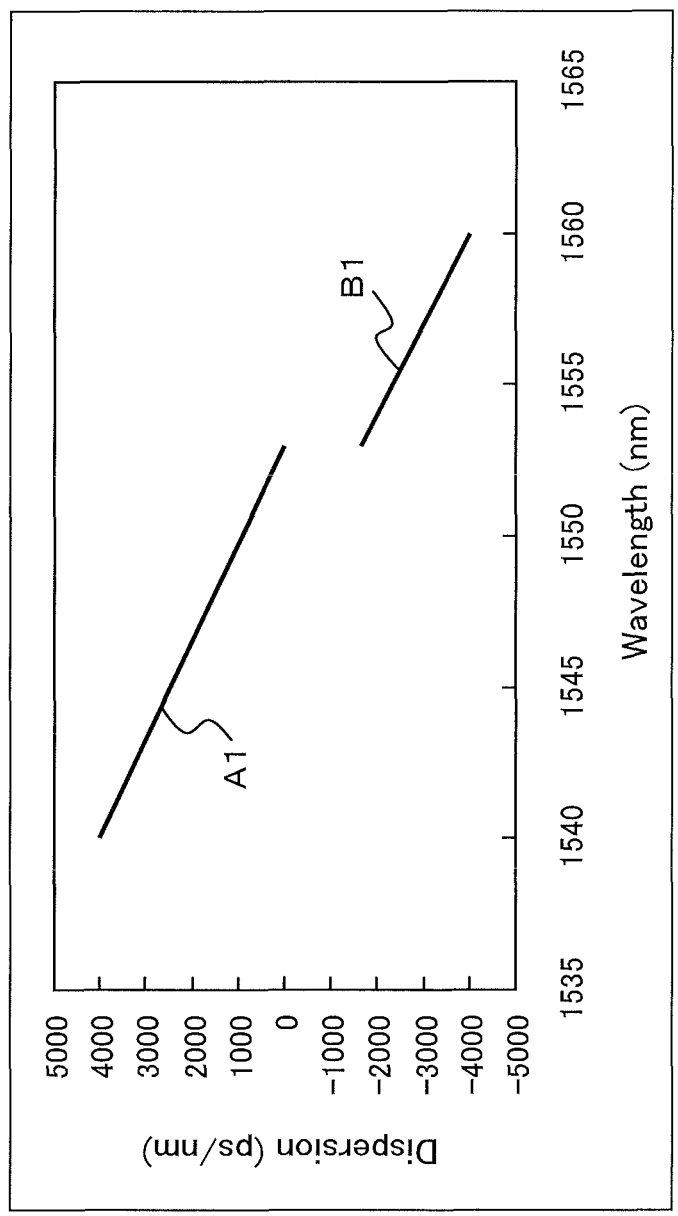
FIG. 14 is a diagram illustrating an exemplary chromatic dispersion characteristic of the slope compensator.

For example, as exemplified in FIG. 14, a fiber grating exhibiting the compensation characteristic indicated by the straight line A1 at wavelengths shorter than 1553 nm, and the compensation characteristic indicated by the straight line B1 (which is different from the straight line A1) at wavelengths longer than 1553 nm, may be used as the slope compensator 21.

Figure 15:
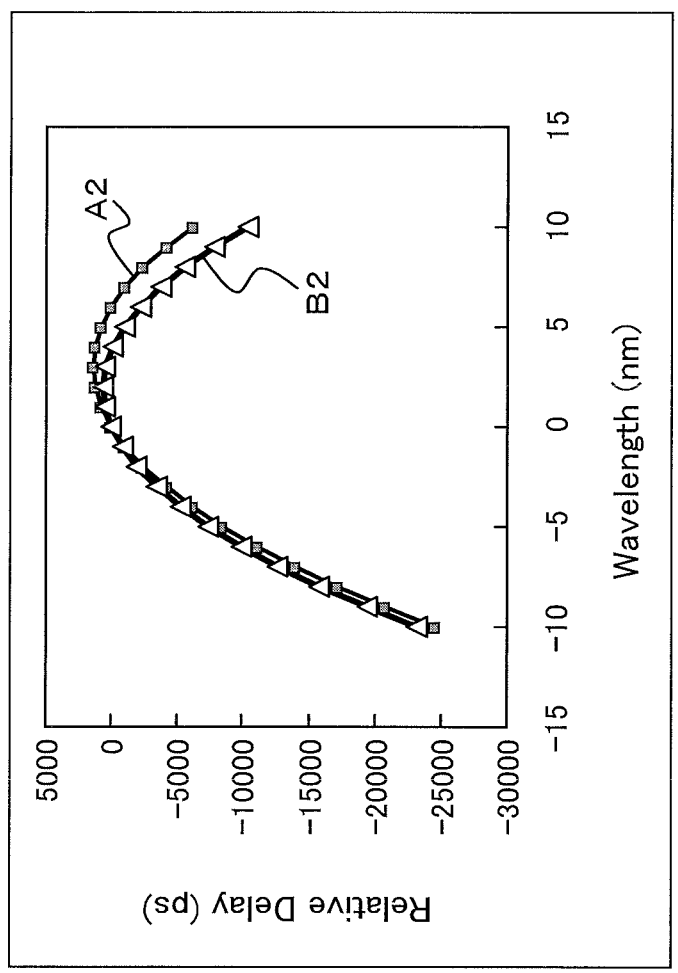
FIG. 15 is a diagram illustrating an exemplary delay characteristic of a slope compensator.
Figure 16:
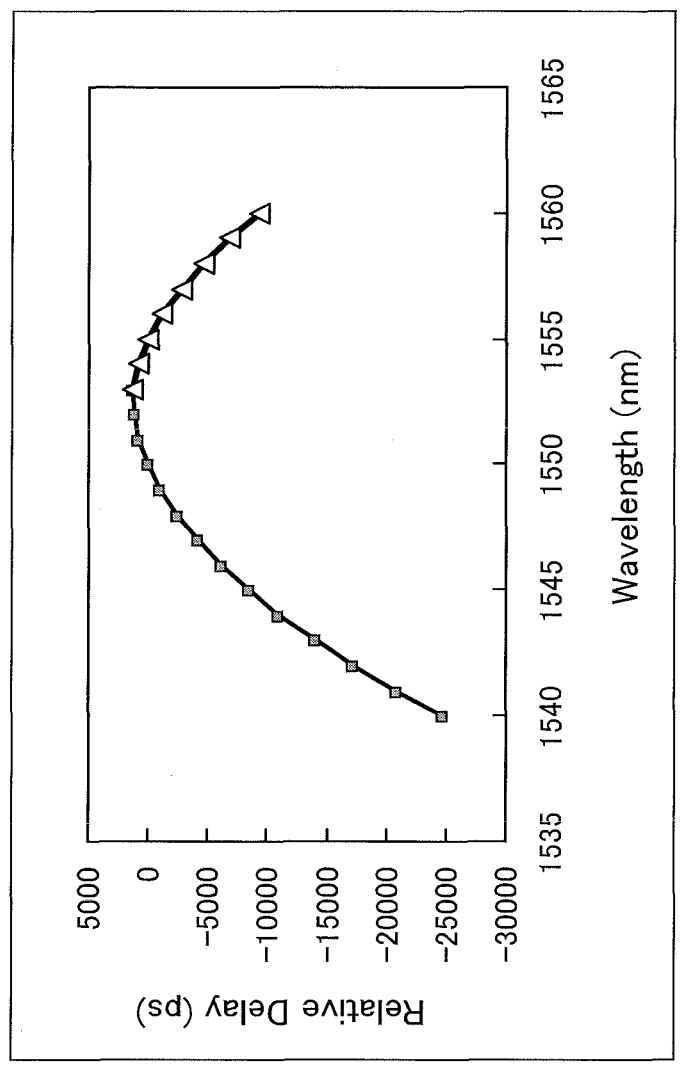
FIG. 16 is a diagram illustrating an exemplary delay characteristic of the slope compensator.

FIG. 15 is a diagram illustrating the delay characteristics A2 and B2 corresponding to the straight lines A1 and B1, which are obtained by integrating the straight lines A1 and B1 with respect to the dispersion compensation characteristic depicted in FIG. 14. FIG. 16 depicts the delay characteristic connecting the two delay characteristics A2 and B2 at 1553 nm where the slope discontinues. By using a fiber grating fabricated so as to exhibit the characteristic as depicted in FIG. 16, dispersion compensation with different slope characteristics can be provided in the different wavelength bands.

In other words, the slope imparting sections 11 and 21 on the transmitting and receiving sides in this case can be configured from a fiber grating, which is one example of a slope imparting device that imparts different dispersion and dispersion slope characteristics in the multiple wavelength bands to an inputted optical signal.

As set forth above, the disclosed technique is advantageous in that the transmission quality can be improved as compared to conventional techniques.

Alternative Embodiment

Figure 17:
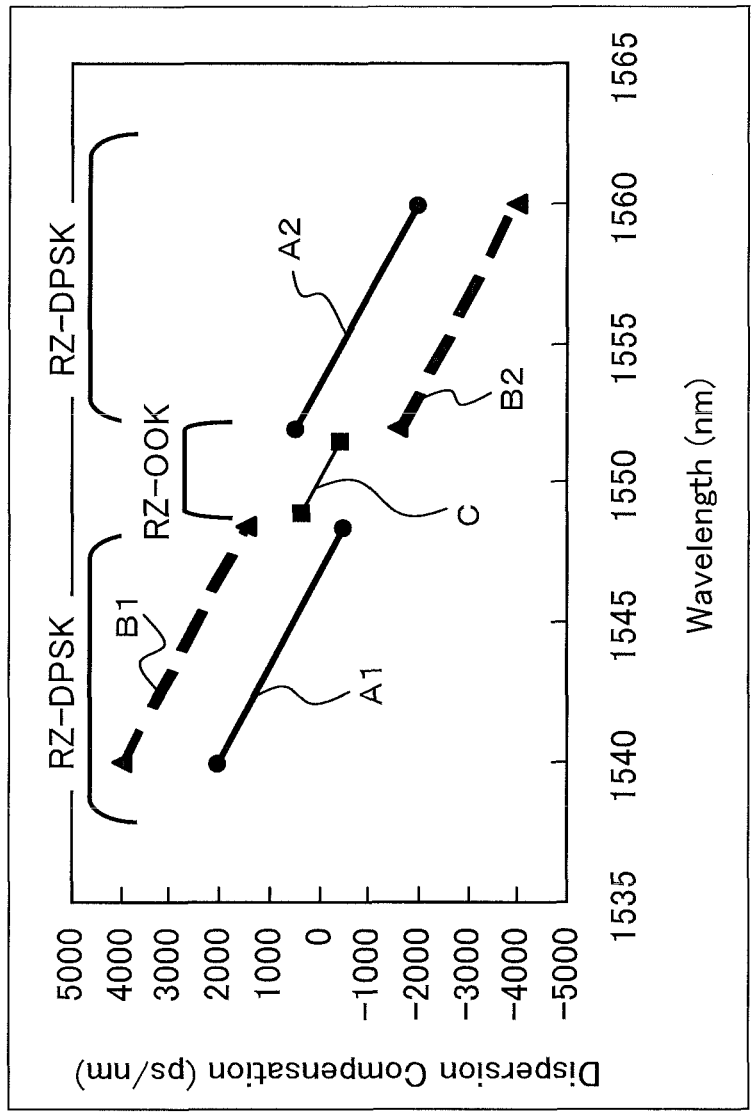
FIG. 17 is a diagram illustrating another example wherein the ratio of the values of dispersion compensation in transmitting and receiving terminals is changed from 50:50.

FIG. 17 is a diagram illustrating a dispersion compensation scheme according to another embodiment. In wavelength division multiplexed communications, a modulation scheme different from the modulation scheme used in the vicinity of the zero dispersion wavelength may be employed, in channels other than the zero dispersion wavelength of an optical fiber, such as an NZ-DSF, constituting an optical transmission path. For example, a phase modulation scheme, such as the differential phase shift keying (DPSK), may be employed at wavelengths other than the zero dispersion wavelength, and an intensity modulation scheme, such as the return to zero-on off keying (RZ-OOK), may be employed in the vicinity of the zero dispersion wavelength, for example.

In this configuration, there is a situation where it is desirable to provide different values of slope compensation for the three wavelength bands: the shorter wavelength region, the wavelength region near the zero dispersion wavelength, and the longer wavelength region. FIG. 17 depicts one example wherein different values of slope compensation are applied in the above-listed three wavelength bands, in the transmitting and receiving terminals 10A and 20A. The dispersion compensation scheme depicted in FIG. 17 specifies values of dispersion compensation, in the manner similar to the case in FIG. 12 where the wavelength band is divided into two wavelength regions, and different values of dispersion compensation and slope compensation are imparted on the transmitting and receiving sides.

Specifically, as exemplified in FIG. 17, in the wavelength region shorter than the zero dispersion wavelength, the ratio is set such that the compensation at the transmitting terminal 10A becomes smaller than the compensation at the receiving terminal 20A. In this case, the slope compensator 11 provided in the transmitting terminal 10A provides dispersion compensation with the characteristic indicated by the line A1 in FIG. 17, and the slope compensator 21 provided in the receiving terminal 20A provides dispersion compensation with the characteristic indicated by the line B1 in FIG. 17.

In the wavelength band near the zero dispersion wavelength, both the transmitting and receiving terminals 10A and 20A impart the similar slope compensation corresponding to the characteristic of the straight line C depicted in FIG. 12 described above. In other words, the slope compensators 11 and 21 both provide dispersion compensation with the characteristic of the straight line C in the zero dispersion wavelength region.

Further, in the wavelength region longer than the zero dispersion wavelength, the ratio is set such that the compensation at the transmitting terminal 10A becomes greater than the compensation at the receiving terminal 20A. In this case, the slope compensator 11 provided in the transmitting terminal 10A provides dispersion compensation with the characteristic indicated by the line A2 in FIG. 17, and the slope compensator 21 provided in the receiving terminal 20A provides dispersion compensation with the characteristic indicated by the line B2 in FIG. 17.

In other words, in the transmitting side dispersion slope imparting section 11, when compared to the dispersion and dispersion slope characteristics A2 imparted in the wavelength division multiplexed optical signal in the long wavelength region, the dispersion and dispersion slope characteristics A1 imparted in the short wavelength region of the wavelength division multiplexed optical signal has the value substantially equivalent to the dispersion slope corresponding to the slope in the depicted wavelength-dispersion compensation characteristic. However, the value corresponding to the intercept is smaller in A1 than in A2, and the wavelength providing the zero dispersion is shifted to the shorter wavelength side.

Further, in the receiving side dispersion slope imparting section 21, when compared to the dispersion and dispersion slope characteristics B2 imparted in the wavelength division multiplexed optical signal in the long wavelength region, the dispersion and dispersion slope characteristics B1 imparted in the short wavelength region of the wavelength division multiplexed optical signal has the value substantially equivalent to the dispersion slope corresponding to the slope in the depicted wavelength-dispersion compensation characteristic. However, the value corresponding to the intercept is greater in B1 than in B2, and the wavelength providing the zero dispersion is shifted to the longer wavelength side.

Figure 18:
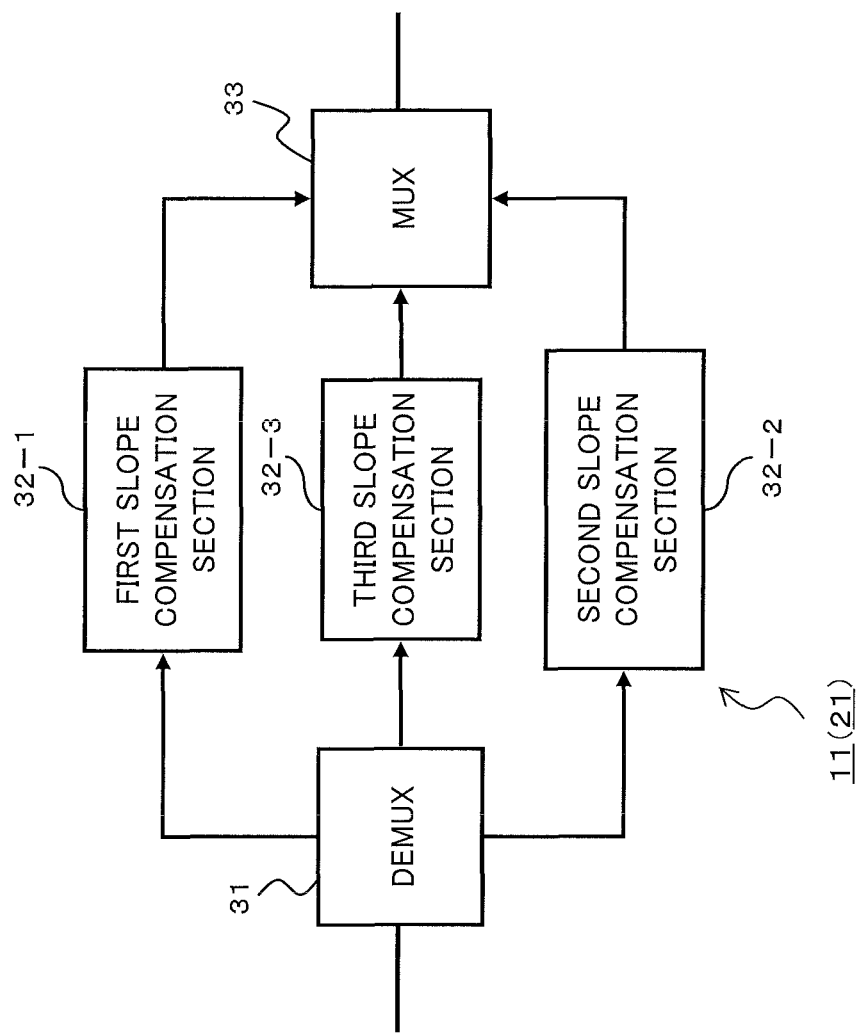
FIG. 18 is a diagram illustrating an exemplary configuration of a slope compensator.

An exemplary configuration of the slope compensators 11 and 21 achieving the above-described dispersion compensation characteristic is depicted in FIG. 18. The slope compensators 11 and 21 each includes a DEMUX 31, first, second, and third slope compensation sections 32-1 to 32-3, and an MUX 33. The demultiplexer (DEMUX) 31 demultiplexes an inputted optical signal to optical signals in the above-described three wavelength bands: the short wavelength region, the zero dispersion wavelength region, and the long wavelength region.

The first slope compensation section 32-1 provides dispersion compensation on the optical signal in the short wavelength region demultiplexed by the DEMUX 31, using the dispersion compensation characteristic that is set therein. The first slope compensation section 32-1 included in the slope compensator 11 in the transmitting terminal 10A provides dispersion compensation in accordance with the characteristic of A1 depicted in FIG. 17, for example, and the first slope compensation section 32-1 included in the slope compensator 21 provided in the receiving terminal 20A provides dispersion compensation in accordance with the characteristic of B1 depicted in FIG. 12, for example.

Similarly, the second slope compensation section 32-2 provides dispersion compensation on the optical signal in the long wavelength region demultiplexed by the DEMUX 31, using the dispersion compensation characteristic that is set therein. The second slope compensation section 32-2 included in the slope compensator 11 in the transmitting terminal 10A provides dispersion compensation in accordance with the characteristic of A2 depicted in FIG. 17, for example, and the second slope compensation section 32-2 included in the slope compensator 21 provided in the receiving terminal 20A provides dispersion compensation in accordance with the characteristic of B2 depicted in FIG. 17, for example.

Further, the third slope compensators 32-3 included in the slope compensators 11 and 21 impart similar slope compensation corresponding to the characteristic of the straight line C depicted in FIG. 12 described above, to the middle wavelength band optical signals demultiplexed by the DEMUX 31

(including the zero dispersion wavelength of the optical transmission path fiber, for example).

It should be noted that the first to third slope compensation sections 32-1 to 32-3 in the slope compensators 11 and 21 can be embodied by using fiber gratings and the like wherein appropriate values of slope compensation according to the above characteristics are set.

The MUX 33 multiplexes optical signals of the respective wavelength bands which undergo dispersion compensation in the first to third slope compensation sections 32-1 to 32-3. In the slope compensator 11, the optical signal multiplexed in the MUX 33 is transmitted through an optical transmission path. On the other hand, in the slope compensator 21, the optical signal multiplexed in the MUX 33 is demultiplexed to signals of respective WDM channels and then received.

The present disclosure is advantageous in that the transmitting and receiving terminals 10A and 20A provide slope compensation with the respective compensation values specified for the transmitting and receiving terminals 10A and 20A, which improves the transmission quality as compared to conventional techniques.

All examples and conditional language recited herein are intended for pedagogical purposes to aid the reader in understanding the invention and concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A communication system comprising:
   a transmission path through which an optical signal is propagated; and
   dispersion slope imparting sections provided on a transmitting side and a receiving side of the transmission path, the dispersion slope imparting sections imparting different dispersion and dispersion slope characteristics in accordance with a wavelength of the optical signal such that the dispersion and dispersion slope characteristics are compensated in total across the transmission path,
   wherein the dispersion and dispersion slope characteristics imparted by the dispersion slope imparting section on the transmitting side are different from those on the receiving side, and
   the dispersion and dispersion slope characteristics imparted by the dispersion slope imparting section on the transmitting side to a wavelength division multiplexed optical signal in a short wavelength region have a comparable value of the dispersion slope but the wavelength providing a zero dispersion is shifted to a shorter wavelength side, as compared to those imparted to the wavelength division multiplexed optical signal in a long wavelength region, and the dispersion and dispersion slope characteristics imparted by the dispersion slope imparting section on the receiving side to the wavelength division multiplexed optical signal in a short wavelength region have a comparable value of the dispersion slope but the wavelength providing a zero dispersion is shifted to a longer wavelength side, as compared to those imparted to the wavelength division multiplexed optical signal in a long wavelength region.

2. The communication system according to claim 1, wherein each of the dispersion slope imparting sections on the transmitting side and the receiving side comprises:
   a demultiplexer that demultiplexes the inputted optical signal into a plurality of optical signals in different wavelength bands; and
   a plurality of slope imparting devices that impart different dispersion and dispersion slope characteristics to the optical signals demultiplexed by the demultiplexer, in accordance with the wavelength bands of the optical signals.

3. The communication system according to claim 1, wherein
   each of the dispersion slope imparting sections on the transmitting side and the receiving side comprises:
   a slope imparting device that imparts different dispersion and dispersion slope characteristics to the inputted optical signal, for the plurality of wavelength bands.

4. The communication system according to claim 2, wherein the slope imparting device is a fiber grating.

5. A dispersion slope imparting section provided on a transmitting side of a transmission path, through which an optical signal is propagated, the dispersion slope imparting section comprising:
   a slope imparting device that imparts dispersion and dispersion slope characteristics in accordance with a wavelength band of the optical signal such that the dispersion and dispersion slope characteristics are compensated in total across the transmission path,
   wherein the dispersion and dispersion slope characteristics imparted by the slope imparting device on the transmitting side are different from those on a receiving side of the transmission path, and
   the dispersion and dispersion slope characteristics imparted by the slope imparting device on the transmitting side to a wavelength division multiplexed optical signal in a short wavelength region have a comparable value of the dispersion slope but the wavelength providing a zero dispersion is shifted to a shorter wavelength side, as compared to those imparted to the wavelength division multiplexed optical signal in a long wavelength region, and the dispersion and dispersion slope characteristics imparted on the receiving side to the wavelength division multiplexed optical signal in a short wavelength region have a comparable value of the dispersion slope but the wavelength providing a zero dispersion is shifted to a longer wavelength side, as compared to those imparted to the wavelength division multiplexed optical signal in a long wavelength region.

6. A method for communicating an optical signal through a transmission path, the method comprising:
   imparting different dispersion and dispersion slope characteristics in accordance with a wavelength band of the optical signal such that the dispersion and dispersion slope characteristics are compensated in total across the transmission path, on a transmitting side and a receiving side of the transmission path,
   wherein the dispersion and dispersion slope characteristics imparted on the transmitting side are different from those on the receiving side, and
   the dispersion and dispersion slope characteristics imparted on the transmitting side to a wavelength division multiplexed optical signal in a short wavelength region have a comparable value of the dispersion slope but the wavelength providing a zero dispersion is shifted to a shorter wavelength side, as compared to those imparted to the wavelength division multiplexed optical signal in a long wavelength region, and the dispersion and dispersion slope characteristics imparted on the receiving side to the wavelength division multiplexed optical signal in a short wavelength region have a comparable value of the dispersion slope but the wavelength providing a zero dispersion is shifted to a longer wavelength side, as compared to those imparted to the wavelength division multiplexed optical signal in a long wavelength region.

* * * * *